Patented Apr. 5, 1949

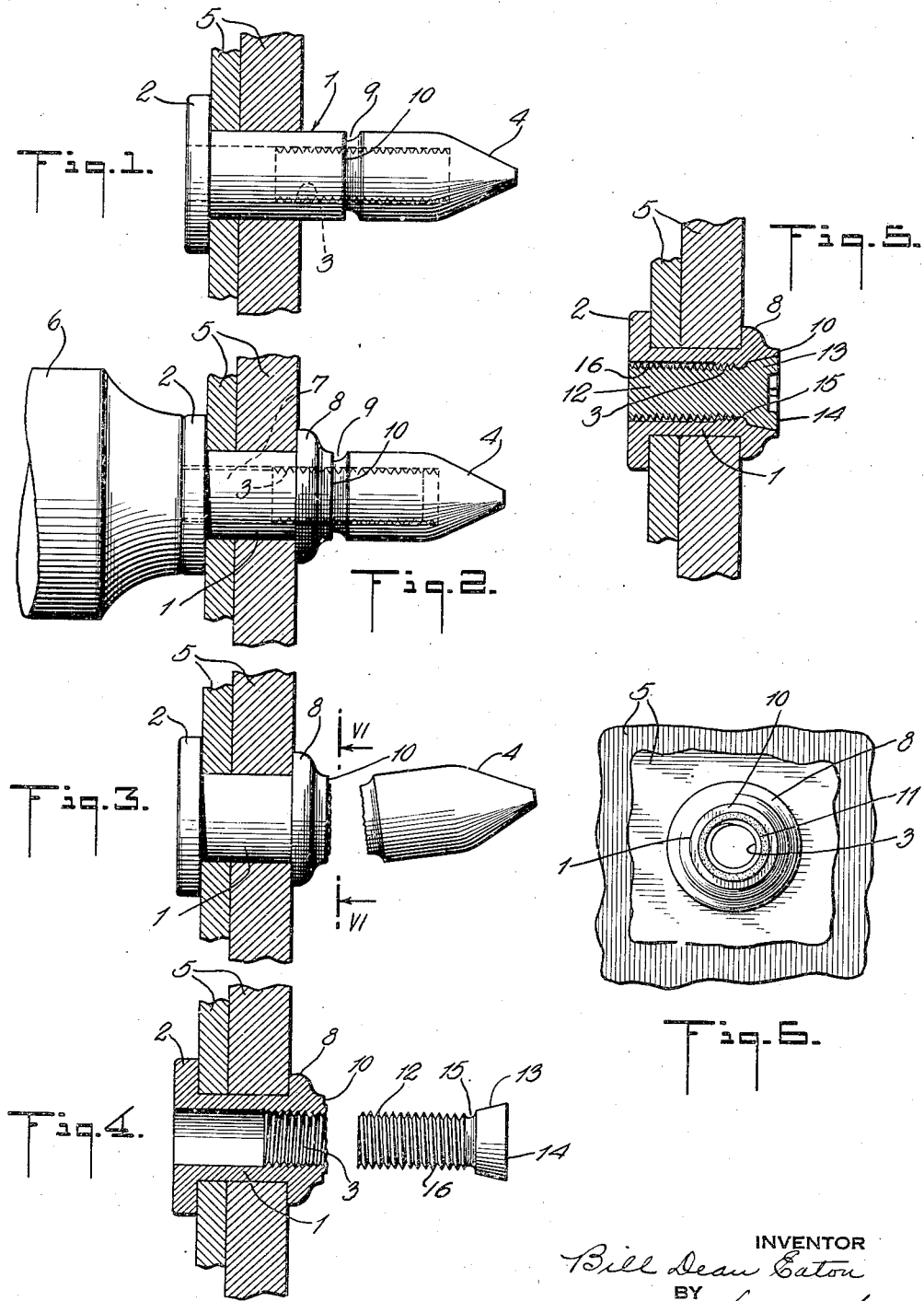

2,466,013

UNITED STATES PATENT OFFICE 2,466,013

FASTENING MEANS

Bill Dean Eaton, Wichita, Kans., assignor to Dymaxion Dwelling Machines Inc., Wichita, Kans., a corporation of Delaware Application February 16, 1946, Serial No. 648,188

7 Claims. (Cl. 85—40)

This invention particularly relates to fastenings of the blind rivet type comprising a malleable metal tubular stud having an outside flange at one end and with its inside provided with a screw thread, with the thread starting at a position spaced from the flanged end and extending toward the opposite end of the stud, this latter end being either open or closed.

Installation of this type is effected by equipment providing an anvil that engages the flanged end and through which a rotative tool extends with a threaded end which can engage the screw thread inside of the stud, the equipment being designed for operation whereby this tool is pulled toward the flanged end while the latter is pushed by the anvil in an opposite direction, this causing a portion of the stud wall to upset while leaving a substantial portion of the stud projecting from the upsetting stud portion oppositely from the flanged end which is the end through which the tool is passed.

In performing its fastening function, the stud of this type of rivet is passed through a hole formed in the parts to be fastened, prior to the upsetting, whereupon upsetting of the stud grips the parts between its flanged end, which functions as a rivet head, and its upsetting portion. When the end of the stud opposite its flanged end is open with the screw thread on its inside formed all the way to this end, a screw is sometimes screwed into this end to close what would otherwise be an open passage.

The above type of rivet is commercially available and its use has introduced the problem that the stud portion projecting from the upset portion oppositely from the flanged end sometimes represents a hazardous or unsightly protuberance that can be removed only by the use of powerful shears, which is inconvenient and unduly expensive, particularly when a large number of rivets are involved.

With the foregoing in mind, the object of the present inventor is to provide for the removal of such a projecting stud portion in a fashion involving greater convenience and less cost, and which is generally more satisfactory than the use of a shear. While the invention is particularly applicable to the specific type of rivet which has been discussed, its principles may be applied to other types of fastenings involving the same problem.

The accompanying drawings illustrate as a specific example of the invention, the described type of rivet incorporating the principles of the invention, Figs. 1 through 5 illustrating progressive steps in the installation of this rivet with Figs. 4 and 5 longitudinally sectioned to provide greater clarity, Fig. 6 being an end view taken from the line VI—VI in Fig. 3.

More specifically, Fig. 1 shows the tubular stud I with the flange 2 extending from its outside at one of its ends and the screw thread 3 on its inside starting at a position spaced from the flange 2 and extending toward the other end of the stud. This other end of the stud is illustrated as being closed although it could be open in so far as the present invention is concerned.

It is possible to taper or point this closed end, as at 4, so that the rivet stud may be guided through the hole in the parts to be fastened together, with convenience even though these holes are not accurately aligned. For illustrative purposes, the parts being interfastened are illustrated as being two flats 5 and such parts sometimes cannot be positioned to bring the rivet holes into accurate registration. This feature of the tapered or pointed end is not part of the present invention but it serves to illustrate one reason why the projecting stud end may have to be removed, this being that such a tapered or sharpened end may constitute an even greater hazard than the usual untapered or cylindrical end, when it is in an exposed position.

The upsetting action is illustrated by Fig. 2, this showing the anvil 6 with the tool 7 extended through it, and it also shows the appearance of the upsetting portion 8 after it is upset. This Fig. 2 illustrates how the stud portion projecting from this upset portion 8 oppositely from its flanged end forms the protuberance which should be removed when it is hazardous or unsightly.

In accordance with the present invention, the stud I is provided with a circumferential groove 9 in its outside at the junction between the upsetting stud portion 8 and the portion projecting therefrom oppositely from its end having the flange 2, this portion projecting a substantial distance because this is required to provide for a properly strong engagement between the threaded end of the tool 7 and the screw thread on the inside of the stud I which provides means for releasably engaging the tool with the stud's inside. This groove 9 facilitates the separation of these portions by breakage of the stud wall at the groove bottom where the stud wall thickness is materially reduced, as is illustrated by Fig. 3. Such breakage may be easily effected by bending the projecting stud portion with a pair of pliers, or by any other handy tool, the operation being done manually and eliminating the former need for using a powerful and therefore heavy shear. The exact location of the groove 9 may vary between positions at the junction between the upsetting portion to the end of the projecting end portion, but maximum compactness is obtained by locating it right at this junction.

Although the use of such a groove has not been apparent to the prior art because it would seem to weaken the wall of the stud so that the tool 7 could not properly make the upset portion 8, it has been discovered that the metal of the grooved stud can properly transmit the necessary force for this function because it is working in compression, whereby even half the normal wall thickness is capable of transmitting the force required. Upon bending, the side opposite the bending direction is locally placed in tension so it can be easily ruptured.

Any rivet that must be upset in the fashion of the type specifically described must be made of sufficiently malleable metal to permit this action, such metal being exemplified by aluminum, copper and their alloys when in their malleable condition. This introduces the problem that when the projecting end of the rivet is broken at the bottom of the groove 9, the broken end surface of the stud may have the roughness characteristic of ruptured malleable metal. Such a roughened end is undesirable both from the appearance and hazard viewpoints, and so the breakage of the stud end, which this invention makes possible, in turn introduces a problem of its own.

The above problem is solved in the case of the present invention by making at least the wall of the groove nearest the upsetting stud portion, this being the wall 10, with a smooth contour that is preferably at right angles to the outside of the stud, although it may angle outwardly slightly from a true right angular relation or be made slightly rounded providing it does not depart greatly from this relation. Therefore, when the projecting stud end is broken off, as shown by Fig. 3, there is left, on the end of the upset portion 8, a smoothly-contoured annulus 10 surrounding the broken stud wall end 11. In other words, such breakage leaves an outer annulus 10 that is smoothly finished by shop workmanship and an inner annulus 11 having the roughness characteristic of ruptured malleable metal, all of which is well shown by Fig. 6. However, by forging the broken roughened end surface, of the broken stud end, inwardly into the inside of the tubular stud, this roughened annulus is hidden from contact and sight, this forging operation being comparatively simple because of the relatively small amount of metal involved.

Although the above forging action may be done by a suitable tool, it is provided for by the present invention in a better manner, this being done by the use of a plug having a shank 12 for insertion into the tubular stud through its broken end and which has a head 13 that flares outwardly from the shank to a diameter greater than the inside diameter of the outer and smoothly-contoured annulus 10 but which is less than that of the outside diameter of this annulus, the angularity of the flare of this head 13 being proportioned to forge the broken stud surface of the inner annulus 11 inwardly when the plug is forced into the broken end of the stud. The end 14 of the head 13 is smoothly contoured to cooperate with the smooth contour provided by the annulus 10, which is the smoothly-contoured wall of the groove 9, so that when this end 14 of the head 13 is flush with this annulus 10, they cooperate to provide a substantially smooth surface for the end of the upsetting portion 8 of the rivet stud that has the finish of shop rather than field workmanship.

In most instances, it is undesirable for the rivet to have a passage through its inside, and it is contemplated that the plug be left positioned, as described, in the case of the finished or installed rivet assembly. Preferably, the maximum diameter of the head 13 is just very slightly greater than the inside diameter of the outer annulus 10, and if the annulus 10 is contoured other than as a flat plane, at right angles to the stud side, such as explained while discussing this annulus as the wall of the groove 9, then the end 14 of the head 13 should be appropriately contoured to cooperatively provide a smooth, sightly and safe finish.

To facilitate the start of the forging action of the head 13, the plug is provided with a circumferential groove 15 at the junction of its shank 12 and head 13, for receiving some of the metal forged inwardly from the broken stud surface 11. The depth of this groove 15 depends on the characteristics of the malleable metal from which the rivet is made, since it should be made just deep enough to properly perform its function which, in turn, depends upon the average peaks of roughness of the broken surface of the stud end. This groove 15 prevents undue spreading of the upset portion 8 of the rivet stud, and it functions to provide for an anchor positively preventing withdrawal of the plug excepting by rupturing the ring of displaced metal forged into this groove and still integral with the inside wall of the stud. The flared head 13 of the plug functions to solidly back up the upset portion 8 of the rivet stud, the completed rivet assembly being extremely secure.

Since the inside of the upset portion 8 of the rivet stud necessarily carries the screw thread 3, or whatever means might be used to effect a releasable engagement between the stud inside and tool 7, it is possible to provide the shank 12 of the plug with a screw thread 16 fitting the thread on the inside of the stud. Then by making a recess in the end 14 of the head 13 to receive a screwdriver or wrench, in the manner conventional in the screw-fastening art, it becomes possible to obtain the force required to make the head 13 perform its forging function, simply by screwing the shank 12 into the thread on the inside of the stud. In case the inside of the stud is provided with some means for releasably connecting it with the tool 7 other than the conventional screw thread, the shank 12 of the plug may be shaped appropriately; but, since screw threads provide the maximum force, they are preferred. Preferably the recess in the end 14 of the head 13 is of the closed-end cross type, because the periphery of this head should be solid.

It is unnecessary to describe the making of the fastening assembly components described herein, since the related prior art teaches enough to permit anyone reasonably skilled in it to properly make the various parts. A description of the method of using the fastening has been combined with the description of the parts in sufficient detail to make elaboration unnecessary.

I claim:

1. A fastening assembly comprising a malleable metal tubular stud having means spaced from one of its ends on its inside for releasably engaging with a tool passed through said end to said means, so that by pulling said tool toward said end while pushing on the stud in an opposite direction a portion of the latter's wall may be upset while leaving a substantial portion of the stud projecting therefrom oppositely from said stud end through which the tool is passed, said stud having a circumferential groove in its outside at the junction between said portions to facilitate their separation by breakage of the stud wall at the groove bottom and with the wall of said groove nearest the upsetting stud portion smoothly contoured to leave a smoothly-contoured annulus surrounding the broken stud wall end; and a plug having a shank for insertion in said stud through its broken end and having a head that flares outwardly from said shank to a diameter greater than that of the inside of said annulus but less than that of its outside with the angularity of its flare proportioned to forge the broken stud surface inwardly when said plug is forced into the broken end of said stud, the end of said plug head being smoothly contoured to cooperate with said annulus when forced flush therewith to provide a substantially smooth contour at the end of the upsetting portion of said stud.

2. A fastening assembly comprising a malleable metal tubular stud having means spaced from one of its ends on its inside for releasably engaging with a tool passed through said end to said means, so that by pulling said tool toward said end while pushing on the stud in an opposite direction a portion of the latter's wall may be upset while leaving a substantial portion of the stud projecting therefrom oppositely from said stud end through which the tool is passed, said stud having a circumferential groove in its outside at the junction between said portions to facilitate their separation by breakage of the stud wall at the groove bottom and with the wall of said groove nearest the upsetting stud portion smoothly contoured to leave a smoothly-contoured annulus surrounding the broken stud wall end, and a plug having a shank for insertion in said stud through its broken end and having a head that flares outwardly from said shank to a diameter greater than that of the inside of said annulus but less than that of its outside with the angularity of its flare proportioned to forge the broken stud surface inwardly when said plug is forced into the broken end of said stud, the end of said plug head being smoothly contoured to cooperate with said annulus when forced flush therewith to provide a substantially smooth contour at the end of the upsetting portion of said stud, said plug having a circumferential groove at the junction of its shank and head for receiving at least some of the metal forged inwardly from said broken stud surface to facilitate the forcing of said plug into the broken end of said stud.

3. A fastening assembly comprising a malleable metal tubular stud having means spaced from one of its ends on its inside for releasably engaging with a tool passed through said end to said means, so that by pulling said tool toward said end while pushing on the stud in an opposite direction a portion of the latter's wall may be upset while leaving a substantial portion of the stud projecting therefrom oppositely from said stud end through which the tool is passed, said stud having a circumferential groove in its outside at the junction between said portions to facilitate their separation by breakage of the stud wall at the groove bottom and with the wall of said groove nearest the upsetting stud portion smoothly contoured to leave a smoothly-contoured annulus surrounding the broken stud wall end; and a plug having a shank for insertion in said stud through its broken end and having a head that flares outwardly from said shank to a diameter greater than that of the inside of said annulus but less than that of its outside with the angularity of its flare proportioned to forge the broken stud surface inwardly when said plug is forced into the broken end of said stud, the end of said plug head being smoothly contoured to cooperate with said annulus when forced flush therewith to provide a substantially smooth contour at the end of the upsetting portion of said stud, said means on the inside of said stud comprising a screw thread formed on said inside and said plug's shank being screw-threaded to fit so the force required to effect said forging may be obtained by screwing said plug into the inside of said stud.

4. A tubular fastening stud having a portion for upsetting and a portion projecting therefrom with a circumferential groove between said portions providing a reduced wall thickness between them which facilitates their separation by breakage, and a plug having a shank for insertion in the broken end of the first-named portion and a flaring head contoured to displace the broken stud surface inside said portion when said plug is forced into the same.

5. A tubular fastening stud having a portion for upsetting and a portion projecting therefrom with a circumferential groove between said portions providing a reduced wall thickness between them which facilitates their separation by breakage, and a plug having a shank for insertion in the broken end of the first-named portion and a flaring head contoured to displace the broken stud surface inside said portion when said plug is forced into the same, said plug having a circumferential groove between its shank and the end of its head for receiving at least some of the broken stud surface displaced by said head.

6. An installed fastening assembly comprising a metal tubular stud passed through a part with its portion outside this part upset thereagainst, and a plug fitting inside said stud and having an outwardly-flared head seated in the stud end portion adjacent its upset portion with portions of the stud end surface metal forged inwardly under said head and with the latter substantially flush with the stud end.

7. An installed fastening assembly comprising a metal tubular stud passed through a part with its portion outside this part upset thereagainst, and a plug having a shank fitting inside said stud and an outwardly-flared head seated in the stud end portion adjacent its upset portion and a circumferential groove between said shank and said head, with portions of the stud end surface metal forged inwardly under said head and into said groove and with the end of said head substantially flush with the stud end.

BILL DEAN EATON.

REFERENCES CITED

The following references are of record in the file of this patent:

UNITED STATES PATENTS

| Number | Name | Date |
|---|---|---|
| 2,166,412 | Kiesel | July 18, 1939 |